United States Patent
Kitago et al.

(10) Patent No.: US 9,129,726 B2
(45) Date of Patent: Sep. 8, 2015

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventors: Ryota Kitago, Kobe (JP); Soh Ishino, Kobe (JP); Ayuko Yamana, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 9 days.

(21) Appl. No.: 14/266,899

(22) Filed: May 1, 2014

(65) Prior Publication Data

US 2014/0326928 A1 Nov. 6, 2014

(30) Foreign Application Priority Data

May 2, 2013 (JP) .................... 2013-097010

(51) Int. Cl.
*H01B 1/24* (2006.01)
*C08L 7/00* (2006.01)
*C08L 9/00* (2006.01)

(52) U.S. Cl.
CPC .... *H01B 1/24* (2013.01); *C08L 7/00* (2013.01)

(58) Field of Classification Search
CPC ....................................................... C08L 9/00
USPC ................ 522/71; 152/543, 524; 524/322
See application file for complete search history.

(56) References Cited

U.S. PATENT DOCUMENTS

| 6,191,206 | B1 | 2/2001 | Detrano |
| 7,640,957 | B2 * | 1/2010 | Sandstrom ................. 152/209.1 |
| 2004/0173295 | A1 * | 9/2004 | Zanzig et al. .............. 152/209.5 |
| 2009/0114321 | A1 * | 5/2009 | Nakamura ................. 152/152.1 |
| 2009/0126844 | A1 | 5/2009 | Nakamura |
| 2012/0325391 | A1 | 12/2012 | Miyazaki |

FOREIGN PATENT DOCUMENTS

| EP | 1 454 765 A1 | 9/2004 |
| EP | 2 165 853 A1 | 3/2010 |
| JP | 8-230407 A | 9/1996 |

* cited by examiner

*Primary Examiner* — Mark Kopec
*Assistant Examiner* — Danny N Kang
(74) *Attorney, Agent, or Firm* — Birch, Stewart, Kolasch & Birch, LLP

(57) ABSTRACT

Provided are a rubber composition for a tire which achieves a balanced improvement in tensile properties at break and fuel economy while providing excellent conductivity; and a pneumatic tire including the rubber composition. The present invention relates to a rubber composition for a tire, including: a rubber component; a carbon black having a nitrogen adsorption specific surface area of 20 to 110 $m^2/g$ and a DBP oil absorption of 60 to 130 ml/100 g; and a conductive carbon black having a nitrogen adsorption specific surface area of 900 $m^2/g$ or larger, a DBP oil absorption of 300 ml/100 g or more, and a volatile content of 0.8% by mass or more, the rubber composition containing 0.1 to 3 parts by mass of the conductive carbon black per 100 parts by mass of the rubber component.

5 Claims, No Drawings

RUBBER COMPOSITION FOR TIRE, AND PNEUMATIC TIRE

TECHNICAL FIELD

The present invention relates to a rubber composition for a tire, and a pneumatic tire formed from the rubber composition.

BACKGROUND ART

Recent fuel economy tires tend to have high electrical resistance, and thus have the problem of a lack of safety, for example, ignition of fuel caused by sparks of static electricity in refueling a vehicle with these tires.

Patent Literature 1 addresses the above problem and teaches a tire including a conductive thin film to ensure conductivity, but this conductive thin film actually hinders the further improvement of fuel economy which has recently been desired. An effective alternative method for ensuring conductivity is to increase the gauge, but this method, too, deteriorates fuel economy and has another drawback of increasing the cost.

Also proposed is a method using a conductive carbon black as filler. This method unfortunately lowers tensile properties at break and flex cracking resistance because the carbon black, which is typically fine particles whose surface has low interaction with rubber, has poor dispersibility in rubber.

CITATION LIST

Patent Literature

Patent Literature 1: JP H08-230407 A

SUMMARY OF INVENTION

Technical Problem

The present invention aims to provide a rubber composition for a tire which can solve the above problems to achieve a balanced improvement in tensile properties at break and fuel economy while providing excellent conductivity, as well as a pneumatic tire including the rubber composition.

Solution to Problem

The present invention relates to a rubber composition for a tire, including: a rubber component; a carbon black having a nitrogen adsorption specific surface area of 20 to 110 $m^2/g$ and a DBP oil absorption of 60 to 130 ml/100 g; and a conductive carbon black having a nitrogen adsorption specific surface area of 900 $m^2/g$ or larger, a DBP oil absorption of 300 ml/100 g or more, and a volatile content of 0.8% by mass or more, the rubber composition including 0.1 to 3 parts by mass of the conductive carbon black per 100 parts by mass of the rubber component.

Preferably, the conductive carbon black is derived from an oil-containing conductive carbon black that is a mixture of 70 to 450 parts by mass of oil and 100 parts by mass of the conductive carbon black.

Preferably, a combined amount of the carbon black and the conductive carbon black is 20 to 70 parts by mass per 100 parts by mass of the rubber component, and a sum α of products formed by multiplying the nitrogen adsorption specific surface area of each of the carbon black and the conductive carbon black by its amount (parts by mass) per 100 parts by mass of the rubber component is 3453 to 6120.

The rubber composition is preferably for use in a carcass cord topping.

The present invention also relates to a pneumatic tire, formed from the rubber composition.

Advantageous Effects of Invention

The present invention provides a rubber composition for a tire, including: a rubber component; a carbon black having a nitrogen adsorption specific surface area of 20 to 110 $m^2/g$ and a DBP oil absorption of 60 to 130 ml/100 g; and a conductive carbon black having a nitrogen adsorption specific surface area of 900 $m^2/g$ or larger, a DBP oil absorption of 300 ml/100 g or more, and a volatile content of 0.8% by mass or more, the rubber composition including 0.1 to 3 parts by mass of the conductive carbon black per 100 parts by mass of the rubber component. Accordingly, the present invention achieves a balanced improvement in tensile properties at break and fuel economy while providing good conductivity.

DESCRIPTION OF EMBODIMENTS

The rubber composition for a tire according to the present invention contains: a rubber component; a carbon black having a nitrogen adsorption specific surface area of 20 to 110 $m^2/g$ and a DBP oil absorption of 60 to 130 ml/100 g; and a conductive carbon black having a nitrogen adsorption specific surface area of 900 $m^2/g$ or larger, a DBP oil absorption of 300 ml/100 g or more, and a volatile content of 0.8% by mass or more.

Here, the filler used is a combination of the carbon black with a given nitrogen adsorption specific surface area and a given DBP oil absorption and the conductive carbon black not only having a high nitrogen adsorption specific surface area and a high DBP oil absorption but also a large amount of volatiles. Such filler has higher interaction with the rubber component and therefore enhanced dispersibility in rubber. Consequently, the rubber composition achieves improvements in tensile properties at break and fuel economy while ensuring good conductivity. Particularly, an oil-containing conductive carbon black, which is a mixture of a conductive carbon black and oil, constitutes a granular material and thus has improved handleability as well as significantly improving tensile properties at break and fuel economy.

Examples of rubber materials that can be used in the rubber component include diene rubbers such as natural rubber (NR), epoxidized natural rubber (ENR), butadiene rubber (BR), styrene butadiene rubber (SBR), isoprene rubber (IR), butyl rubber (IIR), acrylonitrile-butadiene rubber (NBR), chloroprene rubber (CR), styrene isoprene butadiene rubber (SIBR), styrene isoprene rubber, and isoprene butadiene rubber. These rubber materials may be used alone or in combinations of two or more. Preferred among these is a combination of SBR with an isoprene-based rubber such as NR, ENR, or IR because they provide excellent tensile properties at break, fuel economy, and adhesion to cords. A combination of NR and SBR is particularly preferred.

The NR may be, for example, SIR20, RSS#3, or TSR20. The IR and ENR are not particularly limited, and may be ones generally used in the tire industry.

The isoprene-based rubber content based on 100% by mass of the rubber component is preferably 40% by mass or more, and more preferably 60% by mass or more. An isoprene-based rubber content of less than 40% by mass may not achieve sufficient elongation at break, fuel economy, adhesion to fiber cords, processability, and tire durability. The isoprene-based rubber content is preferably 90% by mass or less, and more preferably 80% by mass or less. An isoprene-based rubber content of more than 90% by mass may not result in sufficient handling stability and reversion resistance.

Examples of SBR include, but are not limited to, those generally used in the tire industry, such as emulsion-polymerized styrene butadiene rubber (E-SBR) and solution-polymerized styrene butadiene rubber (S-SBR).

The SBR preferably has a styrene content of 10% by mass or more, and more preferably 20% by mass or more. A styrene content of less than 10% by mass tends to lead to low tensile strength at break of the rubber. The styrene content is preferably 40% by mass or less, and more preferably 30% by mass or less. A styrene content of more than 40% by mass is likely to deteriorate the processability of the rubber compound.

The SBR content based on 100% by mass of the rubber component is preferably 10% by mass or more, and more preferably 20% by mass or more. An SBR content of less than 10% by mass may not achieve sufficient handling stability and reversion resistance. The SBR content is preferably 60% by mass or less, and more preferably 40% by mass or less. An SBR content of more than 60% by mass may not result in sufficient elongation at break, fuel economy, processability, and tire durability.

The combined content of NR and SBR based on 100% by mass of the rubber component is preferably 80% by mass or more, more preferably 90% by mass or more, and may be 100% by mass. If the combined content is less than 80% by mass, then a good balance between tensile strength at break and fuel economy may not be achieved.

The rubber composition of the present invention contains as filler a carbon black having a given nitrogen adsorption specific surface area and a given DBP oil absorption and a conductive carbon black having a given nitrogen adsorption specific surface area, a given DBP oil absorption, and a given volatile content. The use of such fillers enables to achieve the effect of the present invention.

The nitrogen adsorption specific surface area ($N_2SA$) of the carbon black is 20 $m^2/g$ or larger. A $N_2SA$ of smaller than 20 $m^2/g$ tends to result in low reinforcement and low tensile properties at break. The $N_2SA$ is 110 $m^2/g$ or smaller, preferably 100 $m^2/g$ or smaller, and more preferably 90 $m^2/g$ or smaller. A carbon black with a $N_2SA$ of larger than 110 $m^2/g$ tends to deteriorate fuel economy and is also likely to have poor dispersibility, resulting in low tensile properties at break and low durability.

The dibutyl phthalate (DBP) oil absorption of the carbon black is 60 ml/100 g or more, and preferably 70 ml/100 g or more. A DBP oil absorption of less than 60 ml/100 g tends to result in low reinforcement and low tensile properties at break. The DBP oil absorption is 130 ml/100 g or less, and preferably 120 ml/100 g or less. A carbon black with a DBP oil absorption of more than 130 ml/100 g tends to deteriorate tensile elongation at break, resulting in low tensile properties at break and low durability.

The amount of the carbon black per 100 parts by mass of the rubber component is preferably 20 parts by mass or more, and more preferably 30 parts by mass or more. Less than 20 parts by mass of the carbon black may not ensure good strength. The amount of the carbon black is preferably 70 parts by mass or less, and more preferably 50 parts by mass or less. More than 70 parts by mass of the carbon black may deteriorate tan δ (rolling resistance properties) and tensile properties at break.

The nitrogen adsorption specific surface area ($N_2SA$) of the conductive carbon black is 900 $m^2/g$ or larger, and preferably 1000 $m^2/g$ or larger. A $N_2SA$ of smaller than 900 $m^2/g$ is not likely to achieve sufficient conductivity. Also, the $N_2SA$ is preferably 1200 $m^2/g$ or smaller, more preferably 1150 $m^2/g$ or smaller, and still more preferably 1100 $m^2/g$ or smaller. A conductive carbon black with a $N_2SA$ of larger than 1200 $m^2/g$ tends to deteriorate fuel economy and is also likely to have poor dispersibility, resulting in low tensile properties at break and low durability.

The dibutyl phthalate (DBP) oil absorption of the conductive carbon black is 300 ml/100 g or more, and preferably 350 ml/100 g or more. A DBP oil absorption of less than 300 ml/100 g is not likely to achieve sufficient conductivity. The DBP oil absorption is also preferably 600 ml/100 g or less, more preferably 500 ml/100 g or less, and still more preferably 400 ml/100 g or less. A DBP oil absorption of more than 600 ml/100 g is likely to lower tensile properties at break and durability.

The volatile content of the conductive carbon black is 0.8% by mass or more, and preferably 0.9% by mass or more. A conductive carbon black with a volatile content of less than 0.8% by mass may have weak interaction with rubber, leading to poor dispersibility, fuel economy and tensile properties at break. The upper limit for the volatile content is not particularly limited, and is preferably 2.0% by mass or less, and more preferably 1.5% by mass or less.

The conductive carbon black preferably has an iron content of 60 ppm or higher, more preferably 300 ppm or higher, still more preferably 800 ppm or higher, and particularly preferably 1000 ppm or higher. The iron content is preferably 3000 ppm or lower, more preferably 2000 ppm or lower, and particularly preferably 1500 ppm or lower.

The iron content in conductive carbon black herein can be measured by an inductively coupled plasma (ICP) optical emission spectrometer.

The amount of the conductive carbon black per 100 parts by mass of the rubber component is 0.1 parts by mass or more, and preferably 0.5 parts by mass or more. Less than 0.1 parts by mass of the conductive carbon black may not achieve good conductivity as well as excellent tensile properties at break and excellent fuel economy. The amount of the conductive carbon black is 3 parts by mass or less, and preferably 2 parts by mass or less. More than 3 parts by mass of the conductive carbon black is likely to lower tensile properties at break. Here, in the case of using the later-described oil-containing conductive carbon black as the conductive carbon black, the amount of the conductive carbon black refers to the amount of the conductive carbon black contained in the oil-containing conductive carbon black.

The $N_2SA$ of the carbon black and conductive carbon black herein is measured in accordance with JIS K 6217-2:2001. The DBP oil absorption thereof is measured in accordance with JIS K 6217-4:2001. The volatile content thereof is measured in accordance with JIS K 6221 (1982).

In the present invention, the conductive carbon black is preferably derived from an oil-containing conductive carbon black which is a mixture of the conductive carbon black and oil (in which oil is absorbed by the conductive carbon black). Such a conductive carbon black has improved handleability and, at the same time, becomes more compatible with rubber and thus has good dispersibility, significantly improving the property balance between tensile properties at break and fuel economy.

The oil contained in the oil-containing conductive carbon black is not particularly limited, and may be appropriately selected. Examples of the oils include process oils such as aromatic oil, naphtenic oil, and paraffinic oil; oils derived from natural resources such as vegetable oil; and liquid rubbers such as liquid conjugated diene rubbers and liquid hydrogenated conjugated diene rubbers. The oil content makes it possible to control fluidity so as to decrease the viscosity of an unvulcanized rubber composition, i.e., increase fluidity. Thus, such a conductive carbon black is also advantageous in providing good extrudability to the rubber composition.

The method for allowing the conductive carbon black to absorb oil may be any method capable of bringing these components into contact with each other. The method may be, for example, a method of mixing conductive carbon black and oil, and stirring the mixture at a certain temperature until a desired amount of oil is absorbed; or a method of dropping or spraying oil onto conductive carbon black, and further mixing and stirring these components at a certain temperature until a desired amount of oil is absorbed. The mixing and stirring may be performed using a known device such as a high-pressure homogenizer, an ultrasonic homogenizer, a colloid mill, or a Henschel mixer. The certain temperature is not particularly limited as long as it allows absorption of oil, and the temperature may be, for example, 20° C. to 100° C., preferably 40° C. to 80° C. The mixing and stirring time may be appropriately set to the time it takes for a desired amount of oil to be absorbed.

The oil content in the oil-containing conductive carbon black per 100 parts by mass of the conductive carbon black content therein is preferably 70 parts by mass or more, more preferably 200 parts by mass or more, and still more preferably 250 parts by mass or more. An oil content less than 70 parts by mass tends to result in a large amount of fine particles smaller than 125 μm, causing deterioration of handleability such as sticking or a clog in the transport path. The oil content is preferably 450 parts by mass or less, more preferably 400 parts by mass or less, and still more preferably 350 parts by mass or less. An oil content more than 450 parts by mass tends to wet the conductive carbon black so that the carbon black can easily stick to the wall surface, leading to poor handleability.

The blending ratio of the conductive carbon black to the carbon black ([conductive carbon black]/[carbon black] (ratio by mass)) is preferably 0.1/99.9 to 15/85, and more preferably 1/99 to 10/90. The use of these carbon blacks at a ratio lower than 0.1/99.9 may not provide good conductivity, and may not achieve excellent tensile properties at break and fuel economy. Also, a ratio higher than 15/85 tends to lead to reduced tensile properties at break.

Preferably, the sum α of the products formed by multiplying the nitrogen adsorption specific surface area (m$^2$/g) of each filler (each of the carbon black and the conductive carbon black) by its amount (parts by mass) per 100 parts by mass of the rubber component is 3453 to 6120. In other words, in the case that, for example, the rubber composition contains n kinds (n=natural number) of the carbon black including carbon black $C_1$ (N$_2$SA: $C_{1N}$ (m$^2$/g)) to carbon black $C_n$ (N$_2$SA: $C_{nN}$ (m$^2$/g)) in respective amounts $C_{1D}$ to $C_{nD}$ (parts by mass) and also contains m kinds (m=natural number) of the conductive carbon black including carbon black $C_{d1}$ (N$_2$SA: $C_{d1N}$ (m$^2$/g)) to carbon black $C_{dm}$ (N$_2$SA: $C_{dmN}$ (m$^2$/g)) in respective amounts $C_{d1D}$ to $C_{dmD}$ (parts by mass), the following equality holds: $\alpha=(C_{1N} \times C_{1D}+C_{2N} \times C_{2D}+\ldots+C_{nN} \times C_{nD})+(C_{d1N} \times C_{d1D}+C_{d2N} \times C_{d2D}+\ldots+C_{dmN} \times C_{dmD})$.

The sum α is more preferably 3453 to 5185. If the sum α is less than 3453, enough surface area of carbons in the rubber tends not to be ensured, thus resulting in insufficient conductivity and reinforcement. If the sum α is greater than 6120, the surface area of carbons in the rubber tends to be increased so that fuel economy is deteriorated.

The combined amount of the carbon black and the conductive carbon black per 100 parts by mass of the rubber component is preferably 20 parts by mass or more, and more preferably 30 parts by mass or more. The combined amount is preferably 70 parts by mass or less, and more preferably 50 parts by mass or less. With a combined amount falling within the range mentioned above, the effect of the present invention can be well achieved.

The rubber composition of the present invention preferably has an oil content (in the case of using an oil-containing conductive carbon black, a combined amount of the oil contained therein and other oil(s) added) of 3 parts by mass or more, more preferably 7 parts by mass or more, per 100 parts by mass of the rubber component. An oil content less than 3 parts by mass may result in poor handleability. The oil content is preferably 30 parts by mass or less, and more preferably 20 parts by mass or less. An oil content more than 30 parts by mass may lower fuel economy and tensile properties at break.

The rubber composition of the present invention may appropriately contain, in addition to the components mentioned above, additives conventionally used in the rubber industry, such as fillers (e.g. silica, clay, talc), silane coupling agents, zinc oxide, stearic acid, processing aids, various antioxidants, waxes, vulcanizing agents (e.g. sulfur), and vulcanization accelerators.

The rubber composition of the present invention can be prepared by a conventional method. Specifically, the rubber composition can be prepared by a method of, for example, kneading the various components using a Banbury mixer, a kneader, or an open roll mill, and then vulcanizing the kneaded mixture.

The rubber composition of the present invention is suitably usable as a rubber composition for a carcass cord topping which coats carcass cords in a carcass. The carcass is producible by a conventional method, such as by topping both sides of carcass cords, which are stretched and arranged in parallel to each other, with the unvulcanized rubber composition for a tire cord topping. Examples of the carcass cords include fiber cords formed from organic fibers such as polyester, and steel cords formed from steel. Fiber cords are preferred among these.

The pneumatic tire of the present invention can be produced by a conventional method using the above rubber composition. The pneumatic tire is producible by, for example, kneading various additives and the rubber component, coating carcass cords with the kneaded mixture, forming the resulting product into the shape of a carcass and assembling the product with other tire components in a tire building machine in a conventional manner to build an unvulcanized tire, and pressurizing the unvulcanized tire under heat in a vulcanizer.

The pneumatic tire of the present invention can be particularly suitably used as a tire for passenger vehicles, or trucks and buses.

EXAMPLES

Hereinafter, the present invention will be described in more detail with reference to the examples which, however, are not intended to limit the scope of the present invention.

The various chemical agents used in examples and comparative examples are listed below.

NR: TSR20

SBR: JSR1502 (styrene content: 25.2% by mass) from JSR Corporation

Carbon black (1): DIABLACK H (N330, $N_2SA$: 79 $m^2/g$, DBP oil absorption: 105 ml/100 g) from Mitsubishi Chemical Corporation Carbon black (2): N660 ($N_2SA$: 27 $m^2/g$, DBP oil absorption: 87 ml/100 g) from Tokai Carbon Co., Ltd.

Conductive carbon black (1): Lionite CB ($N_2SA$: 1052 $m^2/g$, DBP oil absorption: 378 ml/100 g, volatile content: 1.0% by mass, iron content: 1330 ppm) from LION Corporation Conductive carbon black (2): Ketjen black EC300J ($N_2SA$: 800 $m^2/g$, DBP oil absorption: 365 ml/100 g, volatile content: 0.4% by mass) from LION Corporation Conductive carbon black (3): oil-containing conductive carbon black prepared in the following Production Example 1

Conductive carbon black (4): oil-containing conductive carbon black prepared in the following Production Example 2

Conductive carbon black (5): oil-containing conductive carbon black prepared in the following Production Example 3

Conductive carbon black (6): oil-containing conductive carbon black prepared in the following Production Example 4

Conductive carbon black (7): oil-containing conductive carbon black prepared in the following Production Example 5

Oil: Diana Process AH-24 from Idemitsu Kosan Co., Ltd.

Antioxidant: Antigene 6C (N-(1,3-dimethylbutyl)-N'-phenyl-p-phenylenediamine) from Sumitomo Chemical Co., Ltd.

Stearic acid: Tsubaki from NOF Corporation

Zinc oxide: Zinc oxide from Mitsui Mining & Smelting Co., Ltd.

Sulfur: sulfur powder from Karuizawa Sulfur

Vulcanization accelerator: Nocceler DZ (N,N'-dicyclohexyl-2-benzothiazolylsulfenamide) from Ouchi Shinko Chemical Industrial Co., Ltd.

Production Example 1

Conductive carbon black (1) (Lionite CB, 100 parts by mass) and oil (Diana Process AH-24, 100 parts by mass) were weighed into a beaker, and then stirred at 60° C. until the oil was no longer visible. Thus, conductive carbon black (3) was obtained.

Production Example 2

Conductive carbon black (4) was obtained in the same manner as in Production Example 1, except that the amount of oil was changed to 200 parts by mass.

Production Example 3

Conductive carbon black (5) was obtained in the same manner as in Production Example 1, except that the amount of oil was changed to 300 parts by mass.

Production Example 4

Conductive carbon black (6) was obtained in the same manner as in Production Example 1, except that the amount of oil was changed to 400 parts by mass.

Production Example 5

Conductive carbon black (7) was obtained in the same manner as in Production Example 1, except that the amount of oil was changed to 500 parts by mass.

The conductive carbon black (7) was difficult to handle because the oil exuded to the surface and thus the conductive carbon black stuck strongly to the beaker. Hence, the conductive carbon black (7) was not subjected to the experiments described later.

EXAMPLES AND COMPARATIVE EXAMPLES

The ingredients in amounts shown in Table 1 or 2 except the sulfur and the vulcanization accelerator were kneaded in a Banbury mixer at 160° C. for three minutes, whereby a kneaded mixture was obtained. Thereafter, the sulfur and the vulcanization accelerator were added to the kneaded mixture, and they were kneaded at 80° C. for 5 minutes using a twin-screw open roll mill, so that an unvulcanized rubber composition was prepared. The unvulcanized rubber composition was press-vulcanized at 170° C. for 15 minutes. Thus, a vulcanized rubber composition was prepared.

<Evaluation Items and Test Methods>

1) Handleability (Amount of Fine Particles)

The amount of fine particles of the conductive carbon black smaller than 125 μm was determined after 5-minute sieving in accordance with JIS K 6219. A smaller amount of such fine particles indicates that carbon black is aggregated into more uniform grains, meaning better handleability.

2) Conductivity (Volume Resistivity)

A specimen (2 mm (thickness)×15 cm×15 cm) was prepared from the vulcanized rubber composition. The volume resistivity of the rubber composition specimen was measured using an electrical resistance measuring device R8340A from ADVANTEST at an applied voltage of 100 V under constant temperature and relative humidity conditions (temperature: 25° C., relative humidity: 50%) with other conditions as set forth in JIS K 6271:2008. A smaller measurement value indicates a lower volume resistivity of the rubber composition, meaning better conductivity.

3) Tensile Properties at Break

The tensile strength and elongation at break of the vulcanized rubber composition (vulcanized rubber sheet) were measured in accordance with JIS K 6251. The breaking energy was calculated according to (tensile strength at break)×(elongation at break)/2. The breaking energy of each composition is expressed as an index (breaking energy index) relative to that of Comparative Example 1 (=100), using the following equation. A higher index indicates better tensile properties at break.

(Index of tensile properties at break)=(breaking energy of each composition)/(breaking energy of Comparative Example 1)×100

4) Fuel Economy

The loss tangent (tan δ) of the vulcanized rubber composition was measured using a viscoelastic spectrometer VES (Iwamoto Seisakusho) at a temperature of 50° C., an initial strain of 10%, and a dynamic strain of 2%, and is expressed as an index relative to that of Comparative Example 1 (=100), according to the following equation. A higher index indicates better rolling resistance properties (better fuel economy).

(Fuel economy index)=(tan δ of Comparative Example 1)/(tan δ of each composition)×100

TABLE 1

| | | Comparative Example 1 | Comparative Example 2 | Comparative Example 3 | Comparative Example 4 | Comparative Example 5 | Example 1 |
|---|---|---|---|---|---|---|---|
| Composition (part(s) by mass) | NR | 70 | 70 | 70 | 70 | 70 | 70 |
| | SBR | 30 | 30 | 30 | 30 | 30 | 30 |
| | Carbon black (1) | 45 | 43.5 | 40.5 | 36 | 33 | 43.5 |
| | Carbon black (2) | — | — | — | — | — | — |
| | Conductive carbon black (1) | — | — | — | — | 4 | 0.5 |
| | Conductive carbon black (2) | — | 0.5 | 1.5 | 3 | — | — |
| | Carbon black content in conductive carbon black (3) | — | — | — | — | — | — |
| | Carbon black content in conductive carbon black (4) | — | — | — | — | — | — |
| | Carbon black content in conductive carbon black (5) | — | — | — | — | — | — |
| | Carbon black content in conductive carbon black (6) | — | — | — | — | — | — |
| | Oil content in conductive carbon black | — | — | — | — | — | — |
| | Oil | 10 | 10 | 10 | 10 | 10 | 10 |
| | Antioxidant | 2 | 2 | 2 | 2 | 2 | 2 |
| | Stearic acid | 2 | 2 | 2 | 2 | 2 | 2 |
| | Zinc oxide | 5 | 5 | 5 | 5 | 5 | 5 |
| | Sulfur | 3 | 3 | 3 | 3 | 3 | 3 |
| | Vulcanization accelerator | 1 | 1 | 1 | 1 | 1 | 1 |
| Evaluation | α value | 3555 | 3963 | 4778 | 6000 | 6815 | 3963 |
| | Amount (%) of fine particles (characteristic of conductive carbon black) | — | 4.1 | 4.1 | 4.1 | — | — |
| | Conductivity (×$10^7$ Ω) | 9.1 | 3.8 | 2.9 | 2.1 | 0.6 | 2.3 |
| | Index of tensile properties at break | 100 | 86 | 83 | 59 | 65 | 110 |
| | Fuel economy index | 100 | 106 | 107 | 116 | 124 | 104 |

| | | Example 2 | Example 3 | Example 4 | Example 5 | Example 6 | Example 7 |
|---|---|---|---|---|---|---|---|
| Composition (part(s) by mass) | NR | 70 | 70 | 70 | 70 | 70 | 70 |
| | SBR | 30 | 30 | 30 | 30 | 30 | 30 |
| | Carbon black (1) | 40.5 | 36 | 40.5 | 40.5 | 40.5 | 40.5 |
| | Carbon black (2) | — | — | — | — | — | — |
| | Conductive carbon black (1) | 1.5 | 3 | — | — | — | — |
| | Conductive carbon black (2) | — | — | — | — | — | — |
| | Carbon black content in conductive carbon black (3) | — | — | 1.5 | — | — | — |
| | Carbon black content in conductive carbon black (4) | — | — | — | 1.5 | — | — |
| | Carbon black content in conductive carbon black (5) | — | — | — | — | 1.5 | — |
| | Carbon black content in conductive carbon black (6) | — | — | — | — | — | 1.5 |
| | Oil content in conductive carbon black | — | — | 1.5 | 3 | 4.5 | 6 |
| | Oil | 10 | 10 | 8.5 | 7 | 5.5 | 4 |
| | Antioxidant | 2 | 2 | 2 | 2 | 2 | 2 |
| | Stearic acid | 2 | 2 | 2 | 2 | 2 | 2 |
| | Zinc oxide | 5 | 5 | 5 | 5 | 5 | 5 |
| | Sulfur | 3 | 3 | 3 | 3 | 3 | 3 |
| | Vulcanization accelerator | 1 | 1 | 1 | 1 | 1 | 1 |
| Evaluation | α value | 4778 | 6000 | 4778 | 4778 | 4778 | 4778 |
| | Amount (%) of fine particles (characteristic of conductive carbon black) | — | — | 17.1 | 4.6 | 2.1 | 0 |
| | Conductivity (×$10^7$ Ω) | 1.5 | 0.68 | 1.5 | 1.5 | 1.5 | 1.5 |
| | Index of tensile properties at break | 83 | 80 | 86 | 85 | 85 | 83 |
| | Fuel economy index | 107 | 117 | 107 | 109 | 110 | 112 |

TABLE 2

| | | Example 8 | Example 9 | Example 10 | Example 11 |
|---|---|---|---|---|---|
| Composition (part(s) by mass) | NR | 70 | 70 | 70 | 70 |
| | SBR | 30 | 30 | 30 | 30 |
| | Carbon black (1) | 40 | 35 | 30 | 40 |
| | Carbon black (2) | 2.5 | 7.5 | 12.5 | 5 |
| | Conductive carbon black (1) | 0.91 | 1.06 | 1.21 | 0.15 |
| | Conductive carbon black (2) | — | — | — | — |
| | Carbon black content in conductive carbon black (3) | — | — | — | — |
| | Carbon black content in conductive carbon black (4) | — | — | — | — |

TABLE 2-continued

|  |  | Example 8 | Example 9 | Example 10 | Example 11 |
|---|---|---|---|---|---|
|  | Carbon black content in conductive carbon black (5) | — | — | — | — |
|  | Carbon black content in conductive carbon black (6) | — | — | — | — |
|  | Oil content in conductive carbon black | — | — | — | — |
|  | Oil | 10 | 10 | 10 | 10 |
|  | Antioxidant | 2 | 2 | 2 | 2 |
|  | Stearic acid | 2 | 2 | 2 | 2 |
|  | Zinc oxide | 5 | 5 | 5 | 5 |
|  | Sulfur | 3 | 3 | 3 | 3 |
|  | Vuncanization accelerator | 1 | 1 | 1 | 1 |
| Evaluation | α value | 4185 | 4083 | 3980 | 3453 |
|  | Amount (%) of fine particles (characteristic of conductive carbon black) | — | — | — | — |
|  | Conductivity ($\times 10^7 \Omega$) | 2.3 | 2.1 | 1.3 | 2.3 |
|  | Index of tensile properties at break | 103 | 84 | 90 | 104 |
|  | Fuel economy index | 105 | 112 | 113 | 109 |

Tables 1 and 2 show that the compositions of the examples, each containing a certain carbon black and a conductive carbon black having a high nitrogen adsorption specific surface area, a high DBP oil absorption, and a high volatile content, exhibited a significant improvement of the property balance between tensile properties at break and fuel economy while achieving excellent conductivity, as compared to the composition of Comparative Example 1 with a single kind of carbon black and the compositions of Comparative Examples 2 to 4 with the carbon black and a conductive carbon black having a low volatile content. Especially when the conductive carbon black used was an oil-containing conductive carbon black, handleability was not only improved but also fuel economy and tensile properties at break were further improved.

The invention claimed is:

1. A pneumatic tire, comprising a rubberized carcass cord component comprising a rubber composition for a carcass cord topping, the rubber composition comprising:
   a rubber component containing an isoprene-based rubber and styrene butadiene rubber;
   a carbon black having a nitrogen adsorption specific surface area of 20 to 110 m²/g and a DBP oil absorption of 60 to 130 ml/100 g; and
   a conductive carbon black having a nitrogen adsorption specific surface area of 900 m²/g or larger, a DBP oil absorption of 300 ml/100 g or more, and a volatile content of 0.8% by mass or more,
   the rubber composition comprising 0.1 to 3 parts by mass of the conductive carbon black per 100 parts by mass of the rubber component.

2. The pneumatic tire according to claim 1,
   wherein the conductive carbon black is derived from an oil-containing conductive carbon black that is a mixture of 70 to 450 parts by mass of oil and 100 parts by mass of the conductive carbon black.

3. The pneumatic tire according to claim 1,
   wherein, in the rubber composition for a carcass cord topping, a combined amount of the carbon black and the conductive carbon black is 20 to 70 parts by mass per 100 parts by mass of the rubber component, and
   a sum α of products formed by multiplying the nitrogen adsorption specific surface area of each of the carbon black and the conductive carbon black by its amount (parts by mass) per 100 parts by mass of the rubber component is 3453 to 6120.

4. The pneumatic tire according to claim 1,
   wherein the rubber composition comprises 30 to 70 parts by mass of the carbon black per 100 parts by mass of the rubber component.

5. The pneumatic tire according to claim 1,
   wherein the conductive carbon black is derived from an oil-containing conductive carbon black has an iron content of 60 ppm to 3000 ppm.

* * * * *